(12) United States Patent
Allen et al.

(10) Patent No.: US 6,435,830 B1
(45) Date of Patent: Aug. 20, 2002

(54) ARTICLE HAVING CORROSION RESISTANT COATING

(75) Inventors: William Patrick Allen, Portland; Walter E. Olson, Vernon; Dilip M. Shah, Glastonbury; Alan David Cetel, West Hartford, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/467,516

(22) Filed: Dec. 20, 1999

(51) Int. Cl.[7] .................................. F01D 5/22
(52) U.S. Cl. ..................... 416/193 A; 416/241 R; 416/248
(58) Field of Search ................. 416/241 R, 241 B, 416/193 A, 248; 428/632, 633, 680, 678, 670, 652

(56) References Cited

U.S. PATENT DOCUMENTS

| | | | |
|---|---|---|---|
| 4,209,348 A | | 6/1980 | Duhl et al. .................. 148/3 |
| 4,643,782 A | | 2/1987 | Harris et al. ............... 148/404 |
| 4,719,080 A | | 1/1988 | Duhl et al. ................. 420/443 |
| 4,921,405 A | * | 5/1990 | Wilson .................... 416/241 R |
| 4,933,239 A | * | 6/1990 | Olson et al. ................ 428/557 |
| 5,068,084 A | | 11/1991 | Cetel et al. ................ 420/443 |
| 5,514,482 A | | 5/1996 | Strangman ................. 428/623 |
| 5,912,087 A | * | 6/1999 | Jackson et al. ............. 428/610 |
| 6,089,828 A | * | 7/2000 | Hollis et al. ............. 416/219 R |
| 6,127,048 A | * | 10/2000 | Beele ....................... 428/623 |
| 6,129,991 A | * | 10/2000 | Warnes et al. .............. 428/610 |
| 6,165,600 A | * | 12/2000 | Ivkovich, Jr. et al. ....... 428/213 |

* cited by examiner

Primary Examiner—Edward K. Look
Assistant Examiner—Ninh Nguyen
(74) Attorney, Agent, or Firm—F. Tyler Morrison

(57) ABSTRACT

According to the invention, an article that is exposed to high temperatures, e.g., over 1000° C. during operation is disclosed. In one embodiment, a turbine blade for a gas turbine engine includes a directionally solidified metallic substrate, e.g., a superalloy, which defines an airfoil, a root and a platform located between the blade and root. The platform has an underside adjacent the root, and a corrosion resistant overlay coating such as an MCrAlY is located on the underside of the platform and the neck. The applied coating prevents corrosion and stress corrosion cracking of blade in these regions. Where the airfoil is also coated, the airfoil coating may have a composition different from that of the coating on the underplatform surfaces.

29 Claims, 2 Drawing Sheets

ARTICLE HAVING CORROSION RESISTANT COATING

CROSS REFERENCE TO RELATED APPLICATIONS

Some of the subject matter disclosed herein is also disclosed in commonly owned pending applications Ser. No. 09/467,517 entitled "Article Having Corrosion Resistant Coating" by Allen and Olson, filed on even date herewith and expressly incorporated by reference herein application Ser. No. 09/468,389 entitled "Article Having Corrosion Resistant Coating" by Shah and Cetel and application Ser. No. 09/468,389 "Methods of Providing Article With Corrosion Resistant Coating and Coated Article" and by Allen, Olson, Shah and Cetel.

BACKGROUND OF THE INVENTION

The present invention relates generally to coatings for corrosion protection, and more particularly to an article having such a coating.

Gas turbine engines are well developed mechanisms for converting chemical potential energy, in the form of fuel, to thermal energy and then to mechanical energy for use in propelling aircraft, generating electric power, pumping fluids etc. One of the primary approaches used to improve the efficiency of gas turbine engines is the use of higher operating temperatures. In the hottest portion of modern gas turbine engines (i.e., the primary gas flow path within the engine turbine section), turbine airfoil components, cast from nickel or cobalt based alloys, are exposed to gas temperatures above their melting points. These components survive only because cooling air is passed through a cavity within the component. The cooling air circulates through this cavity reducing component temperature and exits the component through holes in the component, where it then mixes with the hot gasses contained within the primary flow path. However, providing cooling air reduces engine efficiency.

Accordingly, there has been extensive development of coatings for gas turbine hardware. Historically, these coatings have been applied to improve oxidation or corrosion resistance of surfaces exposed to the turbine gas path. More recently, thermal barrier coating have been applied to internally cooled components exposed to the highest gas path temperatures so that the amount of cooling air required can be substantially reduced. Since coatings add weight to a part and debits fatigue life, application of the coating is intentionally limited to those portions of the component for which the coating is necessary to achieve the required durability. In the case of rotating parts such as turbine blades, the added weight of a coating adds significantly to blade pull, which in turn requires stronger and/or heavier disks, which in turn require stronger and/or heavier shafts, and so on. Thus there is added motivation to restrict use of coatings strictly to those portions of the blade, e.g., typically the primary gas path surfaces, where coatings are absolutely required.

With increasing gas path temperatures, turbine components or portions of components that are not directly exposed to the primary turbine gas path may also exposed to relatively high temperatures during service, and therefore may also require protective coatings. For example, portions of a turbine blade that are not exposed to the gas path (such as the underside of the platform, the blade neck, and attachment serration) can be exposed to temperatures in excess of 1200 F. during service. These blade locations are defined at 18 and 19 in FIG. 1. It is expected that the temperatures these portions of the blade are exposed to will continue to increase as turbine operating temperatures increase.

The present invention describes application of a corrosion-resistant coating to portions of turbine blades not directly exposed to the hot gas stream to improve component durability.

It is another object of the invention to provide a corrosion-resistant coating to prevent stress corrosion cracking on portions of components that are not directly exposed to a hot gas stream.

It is yet another object of the invention to provide such a coating to protect against stress corrosion cracking of turbine blades in regions under the blade platform.

SUMMARY OF THE INVENTION

According to one aspect of the invention, improved durability of gas turbine blades is achieved through application of corrosion resistant coatings. A turbine blade for a gas turbine engine, typically composed of a directionally solidified nickel-based superalloy, including an airfoil, a root and a platform located between the blade airfoil and root. The platform has an underside adjacent the blade neck, and the blade neck is adjacent to the blade root.

In one aspect of this invention, a corrosion resistant overlay coating such as an MCrAlY (M typically consisting of nickel and/or cobalt) is applied to the underside of the platform and portions of the blade neck. To maximize corrosion protection, the coating should possess 2040% Cr and 5–20% Al. The presence of this coating improves component life by preventing blade corrosion by the salt accumulating on regions of the blade shielded from direct exposure to the gas path. An additional benefit of the applied coating is the prevention of blade stress corrosion cracking. The corrosion resistant overlay coating prevents corrosion and/or stress corrosion cracking by acting as a barrier between the salt and nickel-based alloy component.

In a more general application of the invention, the corrosion resistant overlay coating system may include an aluminide or platinum aluminide coating layer either between nickel alloy substrate and the MCrAlY layer or over the MCrAlY layer. The aluminide or platinum aluminide layer may be present to provide certain characteristics to the coated component. These characteristics may include more efficient blade repair/manufacture or improved durability.

DETAILED DESCRIPTION OF THE PREFERRED EMBODIMENTS

Figure 1:
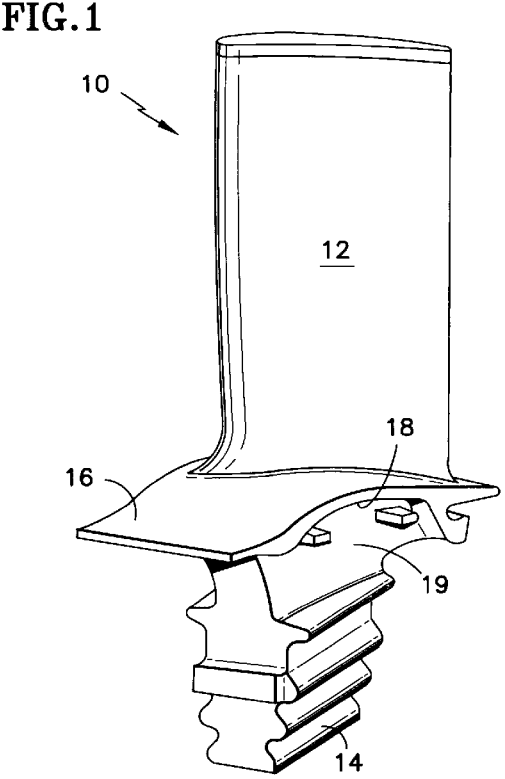
FIG. 1 is an illustration of a superalloy article in accordance with the present invention.

As illustrated in FIG. 1, a turbine blade composed of a superalloy material and incorporating the present invention is illustrated generally by the reference numeral 10. The turbine blade includes an airfoil 12, a serrated blade root 14

(used to attach the blade to the rotatable turbine disk) and a platform 16 located between the airfoil and serrated root. The region between the underside of the blade platform 18 and the root is referred to as the neck 19. Typically, turbine blades (and other gas turbine engine components) are composed of a directionally solidified nickel-based alloy, e.g., consisting of a single crystal or with multiple columnar grains oriented parallel to the direction of growth. Typical compositions of such alloys are shown in Table 1. Exemplary U.S. patents describing columnar and single crystal and directionally solidified alloys include U.S. Pat. Nos. 4,209,348; 4,643,782; 4,719,080 and 5,068,084, each of which is expressly incorporated by reference herein. Cooling holes, which may be positioned on one or more portions of a turbine blade, may be provided for flowing cooling air over the specific portions of the airfoil during operation, as is known generally in the art.

CoCrAlY, NiCoCrAlY and CoNiCrAlY coatings. The coating may also include other elements such as Hf and Si to provide further improvements in oxidation or corrosion resistance. MCrAlY overlay coatings for applications to regions under the blade platform should have a composition (given in wt %) in the range of about 10–40% Cr, 5–35% Al, 0–2 % Y, 0–7% Si, 0–2% Hf, with the balance consisting of a combination and/or Co. Preferred MCrAlY compositions contain 20–40% Cr, 5–20% Al, 0–1% Y, 0–2% Si, and 0–1% Hf (balance Ni and/or Co). Exemplary coatings for optimum corrosion resistance should contain 25–40% Cr, 5–15% Al, 0–0.8 Y, 0–0.5% Si, and 0–0.4% Hf with the balance comprised of Ni an Co. Each of these coatings may also include up to about 20 wt. % of other alloying elements. A summary of typical, preferred and exemplary overlay coating compositions is shown in Table 2.

TABLE 1

COMPOSITION OF COLUMNAR AND SINGLE CRYSTAL ALLOYS

| Alloy | Type | Ni | Co | Cr | Al | Mo | Ta | W | Re | Hf | Ti | Nb |
|---|---|---|---|---|---|---|---|---|---|---|---|---|
| PWA 1422 | DS | Bal. | 10 | 9 | 5 | — | — | 12 | — | 1.6 | 2 | 1 |
| DS R80H | DS | Bal. | 9.5 | 14 | 3 | 4 | — | 4 | — | 0.75 | 4.8 | — |
| CM247LC | DS | Bal. | 9.2 | 8.1 | 5.6 | 0.5 | 3.2 | 9.5 | — | 1.4 | 0.7 | — |
| PWA 1480 | SC | Bal. | 5 | 10 | 5 | — | 12 | 4 | — | — | 1.5 | — |
| PWA 1484 | SC | Bal. | 10 | 5 | 5.65 | 1.9 | 8.7 | 5.9 | 3 | 0.1 | — | — |
| Rene' N5 | SC | Bal. | 7.5 | 7 | 6.2 | 1.5 | 6.5 | 5 | 3 | 0.15 | — | — |
| CMSX-4 | SC | Bal. | 9 | 6.5 | 5.6 | 0.6 | 6.5 | 6 | 3 | 0.1 | 1 | — |

It was discovered that the alkali and alkaline earth sulfate salts responsible for elevated temperature corrosion of turbine components (varying mixtures of sodium, potassium, calcium and magnesium sulfates) can accumulate on regions of the blade outside of the turbine gas path. These salts can be ingested with the inlet air in marine environments and/or form as a result of combustion processes. Corrosion attack of the blade by these salts is typically very limited at temperatures below the salt melting temperature (about 1100 F.). With increased turbine operating temperature, however, blade regions shielded from the gas path can exceed the melting temperature of the sulfate salt resulting in accelerated corrosion of the blade neck and underside of the platform. It was also discovered that at sufficiently high stress levels, the presence of these salts may result in stress corrosion cracking of directionally solidified nickel-based turbine alloys having a single crystal or columnar grain structure. Stress corrosion cracking of these materials represents a newly discovered phenomenon.

Figure 1A:
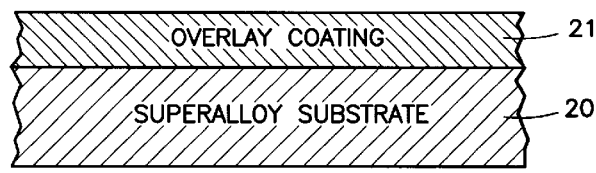
FIG. 1a is a schematic illustration of a coating applied to the article of FIG. 1.

In one aspect of the current invention, a corrosion-resistant overlay coating (21 in FIG. 1a) is applied to portions of the substrate 20 susceptible to stress corrosion, such as the underside of the platform 18 and the neck 19 of a turbine blade to prevent corrosion and/or stress corrosion cracking of the blade in these locations. While the present invention is illustrated in FIG. 1 as a turbine blade, the present invention is not limited to any particular component. Other components exposed to relatively high stress and corrosive conditions would also be expected to benefit from this invention.

The overlay coating applied to the under-platform surface 18 and 19 is preferably an MCrAlY coating, where M is cobalt, nickel, iron or combinations of these materials, although other overlay coatings such as MCr and MCrAl coatings may also be employed. Exemplary coatings useful with the present invention include at least NiCrAlY,

TABLE 2

COMPOSITION OF PROTECTIVE COATINGS (wt %)

| | Coating Composition (wt %) | | | | | |
|---|---|---|---|---|---|---|
| Specified Range | Ni Co | Cr | Al | Y | Si | Hf |
| Typical | Bal. | 10–40 | 5–35 | 0–2 | 0–7 | 0–2 |
| Preferred | Bal. | 20–40 | 5–20 | 0–1 | 0–2 | 0–1 |
| Exemplary | Bal. | 25–40 | 5–15 | 0–0.8 | 0–0.5 | 0–0.4 |

The coating is applied to the blade under-platform and neck to a maximum thickness of about 0.005" (~125 μm). For rotating applications, such as turbine blades, the coating thickness should be adequate to ensure complete coverage of the area to be coated and provide corrosion life necessary for providing protection for a typical blade service interval. The maximum coating thickness is limited due to the fatigue debit associated with the presence of a coating. Accordingly, the thickness for rotating components is preferably less than about 0.003" (~75 μm) and greater than 0.0005" (12.5 μm), and more preferably about 0.002" (~50 μm).

The overlay coating may be applied by various processes known to those skilled in the art, such as by vapor deposition (including electron beam physical vapor deposition, sputtering, etc.) or thermal spray (air plasma spray, low pressure or vacuum plasma spray, high velocity oxy-fuel, etc.). Coating application by cathodic arc deposition was used to demonstrate this invention. This method is preferred to the extent that it provides enhanced thickness control of deposited coatings. An exemplary cathodic arc deposition apparatus for applying the coating is described in commonly owned and co-pending application Ser. No. 08/919,129, filed on Aug. 30, 1997 and entitled "Cathodic Arc Vapor Deposition Apparatus" which is expressly incorporated by reference herein.

Figure 2:
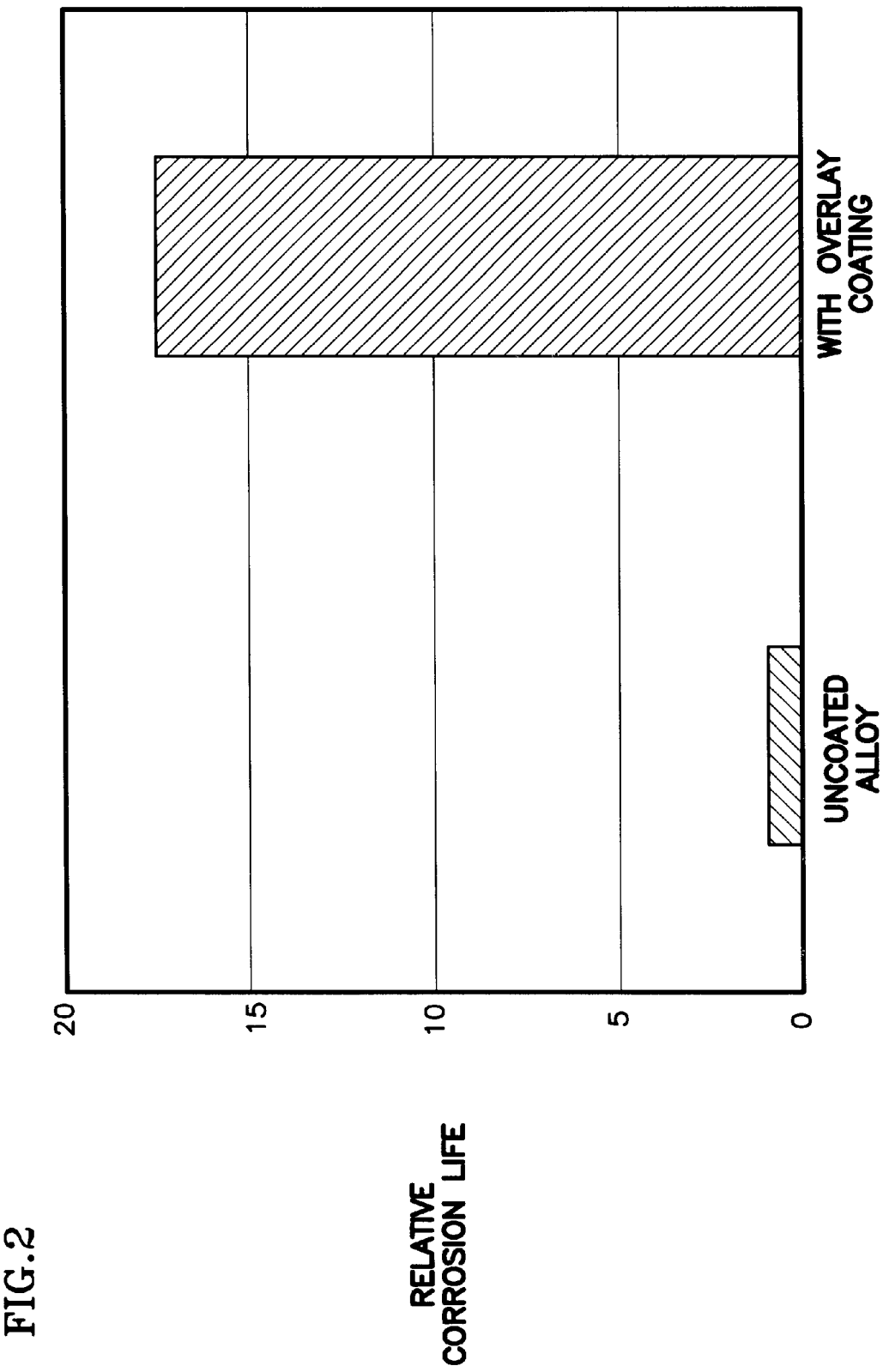
FIG. 2 is representative of the corrosion life improvement achieved with overlay coating.

FIG. 2 illustrates the corrosion life improvement achieved through application of coatings disclosed in this invention. The under-platform surface of a single crystal turbine blade was coated with an exemplary MCrAlY coating comprised of about 35 wt. % Cr, 8 wt. % Al, 0.6 Y, 0.4 wt. % Si and 0.25 wt. % Hf, balance nickel. Corrosion testing of the coated blade at 1350° F. in the presence of sulfate salt showed a 5–20× improvement in corrosion life relative to the uncoated blade as measured by the relative depths of corrosion attack. Application of the same corrosion resistant overlay coating to test specimens was also shown to prevent stress corrosion cracking of the single crystal alloy.

Figure 3:
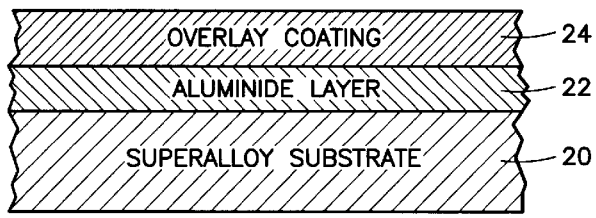
FIG. 3 is a schematic illustration of another embodiment of the present invention.

FIG. 3 represents an alternate embodiment of the present invention. The component includes a metallic substrate 20, e.g., a superalloy material, an aluminide (or platinum aluminide) layer 22 and an overlay coating 24 on the aluminide layer. Aluminide and platinum aluminide layers are known generally, and the particular composition and method of application is not described here in detail. See, e.g., U.S. Pat. No. 5,514,482. The aluminide or platinum aluminide layer may be present to provide the coating with some desired property or may be pre-existing, e.g., where the overlay coating is applied during repair or refurbishment of the component and a preexisting aluminide layer is not removed as part of the repair or refurbishment.

Figure 4:
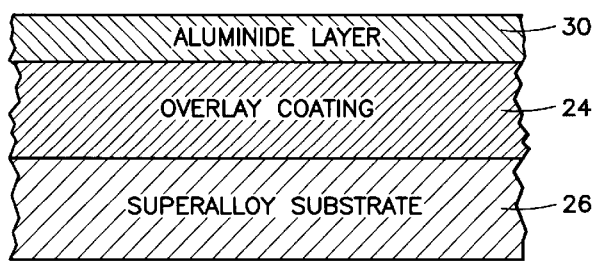
FIG. 4 is a schematic illustration of still another embodiment of the present invention.

FIG. 4 is another alternate embodiment of the present invention. The component (not shown in its entirety) includes a metallic substrate 26, e.g., a superalloy material, an overlay coating 24 on the substrate and an aluminide layer 30 on the overlay coating. The aluminide layer may be present, for example, to provide the coating with some desired property.

In many cases, a portion of the article subjected to high temperatures is also coated. In the case of turbine blades, the airfoil portion may be covered with a metallic overlay coating, such as the types descried above, or with an aluminide coating, such as are described in the above '482 patent, or with a ceramic thermally insulating layer, or some combination of these coatings. In many cases, the airfoil portion will be coated with a coating having a composition different than applied to the underplatform and neck portions, and in other cases the compositions may be similar or the same. For example, the airfoil surface may be covered with an aluminide while the underplatform surface and neck may be coated with an MCrAlY overlay-type coating. Other combinations of coatings, of course, are also possible and the present invention is not intended to be limited to any particular combination of coatings on the exposed portion(s) and the shielded portion(s) of a component.

The present invention provides significant improvements in durability over the prior art. Field experience has shown that blades without coating in these areas can be subject to severe corrosion damage during service. Application of a metallic overlay coating of the preferred compositions on selected portions of an article subjected to high temperatures, such as the under-platform surface and neck of a turbine blade, provides superior corrosion and stress corrosion cracking protection during operation.

While the present invention has been described above in some detail, numerous variations and substitutions may be made without departing from the spirit of the invention or the scope of the following claims. Accordingly, it is to be understood that the invention has been described by way of illustration and not by limitation.

What is claimed is:

1. A turbine blade for a gas turbine engine comprising a superalloy substrate defining an airfoil, a neck, and a platform located between the airfoil and root, the platform has an underside adjacent the neck, and a corrosion resistant overlay coating is applied only on selected portions of the blade comprising the underside of the platform and blade neck and not on other portions of the blade.

2. The turbine blade of claim 1, wherein the coating is an MCrAlY overlay coating (M representing combinations of Ni, Co and/or Fe).

3. The turbine blade of claim 1, wherein the coating contains 10–40% Cr, 5–35% Al, 0–2% Y, 0–7% Si, 0–2% Hf, balance primarily Ni and/or Co with all other elemental additions comprising <20% of the total.

4. The turbine blade of claim 1, wherein the coating contains 20–40% Cr, 5–20% Al, 0–1% Y, 0–2% Si, 0–1% Hf, balance primarily Ni and/or Co with all other elemental additions comprising <20% of the total.

5. The turbine blade of claim 1, wherein the coating contains 25–40% Cr, 5–15% Al, 0–0.8% Y, 0–0.5% Si, 0–0.4% Hf, balance primarily Ni and/or Co with all other elemental additions comprising <20% of the total.

6. The turbine blade of claim 1, wherein the coating has a nominal thickness of less than about 0.005".

7. The turbine blade of claim 1, wherein the coating has a thickness between about 0.0005–0.003".

8. The turbine blade of claim 1, further comprising another coating on the airfoil surface, the composition of the another coating being different than the corrosion resistant overlay coating.

9. The turbine blade of claim 1, further comprising: an aluminide layer on the substrate surface, the overlay coating on the aluminide layer.

10. The turbine blade of claim 1, further comprising a platinum aluminide layer on the substrate surface, the overlay coating on the platinum aluminide layer.

11. The turbine blade of claim 1, further comprising an aluminide layer located on the overlay coating.

12. The turbine blade of claim 1, further comprising a platinum aluminide layer located on the overlay coating.

13. The turbine blade of claim 1, wherein the substrate is comprised of an equiaxed nickel-based alloy.

14. The turbine blade of claim 1, wherein the substrate is composed of a directionally solidified nickel-based alloy.

15. The turbine blade of claim 1, wherein the substrate is comprised of a single crystal nickel-based alloy.

16. The turbine blade of claim 1, wherein the substrate is comprised of a columnar grain nickel-based alloy.

17. A superalloy gas turbine component which operates in an environment with primary gas path temperatures in excess of 1000° C., the component having a first, exposed portion which is directly exposed to hot gas path, a second, shielded section which is shielded from direct exposure to the hot gas path, and a third section between the exposed and shielded portions, the improvement which comprises a corrosion resistant overlay coating applied only to selected portions of the third section and not to the other sections.

18. The component of claim 17 comprising a turbine blade, the first portion forming an airfoil, the airfoil covered by a first coating, the second portion forming a root, and the third section forming a platform and neck, the improvement comprising a corrosion resistant coating applied to the underside of the platform and neck, the first coating having a composition different that the composition of the overlay coating.

19. The component of claim 17, wherein the components is composed of a directionally solidified superalloy material.

20. The component of claim 17, wherein the overlay coating is an MCrAlY coating (M representing combinations of Ni, Co and/or Fe).

21. The component of claim 17, wherein the coating in weight percent contains 10–40% Cr, 5–35% Al, 0–2% Y, 0–7% Si, 0–2% Hf, balance primarily Ni and/or Co with all other elemental additions comprising about <20% of the total.

22. The component of claim 17, wherein the coating contains 20–40% Cr, 5–20% Al, 0 –1% Y, 0–2% Si, 0–4% Hf, balance primarily Ni and/or Co with all other elemental additions comprising about <20% of the total.

23. The component of claim 17, wherein the coating contains 25–40% Cr, 5–15% Al, 0–0.8% Y, 0–0.5% Si, 0–0.4% Hf, balance primarily Ni and/or Co with all other elemental additions comprising about <20% of the total.

24. The component of claim 17, wherein the coating has a nominal thickness of less than about 0.005".

25. The component of claim 17, wherein the coating has a thickness between about 0.0005–0.003".

26. The component of claim 17, further comprising an aluminide layer on the substrate surface, the overlay coating on the aluminide layer.

27. The component of claim 17, further comprising a platinum aluminide layer on the substrate surface, the overlay coating on the platinum aluminide layer.

28. The component of claim 17, further comprising an aluminide layer located on the overlay coating.

29. The component of claim 17, further comprising a platinum aluminide layer located on the overlay coating.

* * * * *